United States Patent [19]

Zhang et al.

[11] Patent Number: 6,140,433
[45] Date of Patent: Oct. 31, 2000

[54] THERMOPLASTIC ELASTOMERIC BLOCK COPOLYMERS AND PROCESS FOR THE PREPARATION THEREOF

[75] Inventors: Nairan Zhang; Wenjuan Sun, both of Beijing, China

[73] Assignees: China Petrochemical Corporation; Research Institute of Beijing Yanshan Petrochemical Corporation, both of Beijing, China

[21] Appl. No.: 09/011,358

[22] PCT Filed: Aug. 5, 1996

[86] PCT No.: PCT/CN96/00059

§ 371 Date: Jun. 16, 1998

§ 102(e) Date: Jun. 16, 1998

[87] PCT Pub. No.: WO97/06194

PCT Pub. Date: Feb. 20, 1997

[30] Foreign Application Priority Data

Aug. 4, 1995 [CN] China ................................. 95107916

[51] Int. Cl.⁷ .................................................. C08F 297/04
[52] U.S. Cl. .............................................. 526/173; 525/271
[58] Field of Search ................................... 525/271, 314

[56] References Cited

U.S. PATENT DOCUMENTS 4,089,913  5/1978  Miki et al. .
4,939,208  7/1990  Lanza et al. .................... 525/271 X
5,256,736  10/1993 Trepka et al. .
5,393,838  2/1995  Moczygemba et al. .
5,438,103  8/1995  DePorter et al. .

FOREIGN PATENT DOCUMENTS 0 242 612  10/1987  European Pat. Off. .
0 492 490  7/1992   European Pat. Off. .
0 512 530  11/1992  European Pat. Off. .
0 646 607  4/1995   European Pat. Off. .
0 654 488 A1  5/1995  European Pat. Off. .
0 673 953  9/1995   European Pat. Off. .

*Primary Examiner*—Fred Teskin
*Attorney, Agent, or Firm*—Kenyon & Kenyon

[57] ABSTRACT

This invention relates to a thermoplastic elastomeric block copolymer and process for the preparation thereof. According to this invention, the block copolymer obtained through block copolymerization process at higher temperature and adding butyllithium in twice during copolymerization are mixed block copolymer of $A_1$-B-$A_2$/B-$A_2$ and B-$A_2$/B-$A_2$ (where A represents monovinyl aromatic monomer; B represents conjugated diene monomer) having different blocks, higher elongation and appropriate melt index. The process of this invention is simple and efficient. The thermoplastic elastomeric block copolymer of this invention are particularly useful for various applications of typical styrene butadiene block copolymer, especially plastic modifier.

11 Claims, No Drawings

THERMOPLASTIC ELASTOMERIC BLOCK COPOLYMERS AND PROCESS FOR THE PREPARATION THEREOF

FIELD OF THE INVENTION

The present invention relates to a thermoplastic elastomeric block copolymer of $C_4$–$C_6$ conjugated diene/monovinyl aromatic monomer having two kinds of structures, the properties of which, such as elongation, tensile strength at break, melt index and hardness can be conveniently regulated according to the application requirements so that it can be suitable for use in various applications of conventional styrene butadiene block copolymers, and to a process for the preparation thereof.

BACKGROUND OF THE INVENTION

The tri-block copolymer having poly-monovinyl aromatic monomer (typically styrene) block, poly-conjugated diene (typically butadiene) block and poly-monovinyl aromatic monomer block (abbreviated as A-B-A) is a kind of thermoplastic elastomer and has been widely used. The known processes for the preparation thereof include: two-step process which comprises first charging the initiator and styrene, and then charging styrene and butadiene after completion of the first polymerization step; coupling process which comprises first charging the initiator and styrene, charging butadiene after completion of the first polymerization step, and then charging a coupling agent after completion of the second polymerization step; or three-step process which comprises first charging the initiator and styrene, charging butadiene after completion of the first polymerization step, and then charging styrene after completion of the second polymerization step.

The results of application show the A-B-A copolymers still have some drawbacks in their properties, and therefore many attempts have been made to improve their properties by regulating their structures. For example, U.S. Pat. No. 4,104,330 disclosed a tetra-block copolymer having monovinyl aromatic monomer homopolymer block, conjugated diene homopolymer block, tapered monovinyl aromatic monomer/conjugated diene copolymer block and monovinyl aromatic monomer homopolymer block; U.S. Pat. No. 4,600,749 disclosed a multi-block copolymer having at least four blocks, that is tapered monovinyl aromatic monomer/conjugated diene copolymer block, monovinyl aromatic monomer homopolymer block, conjugated diene homopolymer block and monovinyl aromatic monomer homopolymer block. These copolymers are characterized in that in their molecular chains, there is further incorporated tapered monovinyl aromatic monomer/conjugated diene copolymer block in addition to monovinyl aromatic monomer homopolymer block, conjugated diene homopolymer block and monovinyl aromatic monomer homopolymer block, thereby forming multi-block copolymers having more than four blocks. As thermoplastic elastomer, many properties of these tetra-block or multi-block copolymers have been improved, but some properties are still not sufficiently desirable, more particularly, when the content of monovinyl aromatic monomer is higher, the elongation is lower, the hardness tends to be larger or the melt index and the strength are inappropriate, and therefore fail to meet the requirements of some application fields. Moreover, the procedures for preparing these block copolymers are complicated, and the polymerization lasts too long, which leads to a low production efficiency.

DISCLOSURE OF THE INVENTION

It is an object of the present invention to provide a thermoplastic elastomeric block copolymer comprising of $C_4$–$C_6$ conjugated diene/monovinyl aromatic monomer having two kinds of structures, the properties of which can be conveniently regulated according to the application requirements, wherein the constituents of said composition can be controlled by conveniently controlling the process conditions for the preparation thereof, and thus their properties can be controlled, which renders them suitable for use in various applications, for example plastic modifier, asphalt modifier, materials for shoe manufacturing and other non-tyre industrial articles of universal rubber as well as adhesives etc.

Another object of the present invention is to provide a thermoplastic elastomeric block copolymer $C_4$–$C_6$ conjugated diene/monovinyl aromatic monomer block copolymers, which has high elongation and appropriate melt index, and is especially suitable for use as plastic modifier.

A further object of the present invention is to provide a convenient process for the preparation of the thermoplastic elastomeric block copolymer mentioned above, wherein the constituents of the resultant copolymer can be controlled by altering the process conditions, thereby controlling its properties, said process can be operated in a convenient manner, and the polymerization time can be greatly shortened, which leads to a high production efficiency. When containing a copolymer of formula $B$-$A_2$/$B$-$A_2$(II) having only one monovinyl aromatic monomer homopolymer block, the properties of a tetra-block copolymer of formula $A_1$-$B$-$A_2$/$B$-$A_2$(I) having tapered monovinyl aromatic monomer/conjugated diene copolymer block, such as elongation and melt index etc. can be advantageously improved; and that by controlling the technical conditions for the preparation, the ratio of (I) to (II) can be regulated, thus the properties of the resultant copolymer.

The present inventors have found that such as elongation, tensile strength at break and melt index etc. can be regulated within a wide range, which renders it suitable for use in various applications. Moreover, the ratio of $A_1$ to $A_2$ has also larger influence on elongation and melt index etc., and therefore the properties can be further controlled by appropriately controlling and regulating the ratio of $A_1$ to $A_2$.

The present inventors have further found that by appropriately increasing and controlling the polymerization temperature, the random copolymerization of monovinyl aromatic monomer and $C_4$–$C_6$ conjugated diene can be accelerated and controlled, and thus the properties, for example elongation etc., of the resultant copolymer can be controlled; moreover, by increasing the polymerization temperature, the polymerization rate can be increased, thereby the polymerization time can be shortened, which leads to an improved production efficiency.

Therefore, the above-mentioned objects of the present invention can be realized by the following thermoplastic elastomeric block copolymer and the process for the preparation thereof.

In an aspect of the present invention, there is provided a thermoplastic elastomeric block copolymer having the following two structures.

$A_1B$-$A_2$/$B$-$A_2$(I)

$B$-$A_2$/$B$-$A_2$(II)

wherein $A_1$ represents monovinyl aromatic monomer homopolymer block formed by the first monovinyl aromatic monomer charge, $A_2$ represents monovinyl aromatic monomer homopolymer block formed by the second monovinyl aromatic monomer charge, B represents $C_4$–$C_6$ conjugated diene homopolymer block, $A_2$/B represents random copolymer block formed by the second monovinyl aromatic monomer charge and $C_4$–$C_6$ conjugated diene.

In another aspect of the present invention, there is provided a process for the preparation of the thermoplastic elastomeric block copolymer mentioned above, comprising the steps of:

(1) polymerizing a first monovinyl aromatic monomer charge($A_1$) under anionic polymerization conditions and in the presence of a first organolithium compound initiator charge(Li1), and allowing essentially complete polymerization of the monomers to occur; thereafter (2) to the reaction mixture obtained in step (1), charging $C_4$–$C_6$ conjugated diene (B), a second monovinyl aromatic monomer charge($A_2$) and a second organolithium compound initiator charge(Li2), and allowing essentially complete polymerization of the monomers to occur at higher temperature.

The present invention will be described in more detail in the following.

The $C_4$–$C_6$ conjugated diene suitable for use in the present invention is conjugated diene having 4–6 carbon atoms, including, for example 1,3-butadiene, isoprene, 2,3-dimethyl-1,3-butadiene and 1,3-pentadiene, which can be used alone or in combination, with 1,3-butadiene being preferred. The monovinyl aromatic monomer suitable for use in the present invention is vinyl aromatic monomer having one vinyl group directly attached to aromatic nucleus, including, for example, styrene, para-methyl styrene, ortho-methyl styrene, meta-methyl styrene, para-ethyl styrene, ortho-ethyl styrene, meta-ethyl styrene, alpha-vinyl naphthalene and beta-vinyl naphthalene, which can be used alone or in combination, with styrene being preferred.

In the present invention, the charging ratio of the first monovinyl aromatic monomer charge to the second monovinyl aromatic monomer charge($A_1/A_2$) is 1/1.0–1/1.5(by weight), preferably 1/1.1–1/1.3(by weight); the total charging ratio of monovinyl aromatic monomers to $C_4$–$C_6$ conjugated diene($A_{total}/B_{total}$) is 10/90–60/40(by weight), preferably 25/75–45/55(by weight).

In the process according to the present invention, the organolithium compound used may be hydrocarbyl lithium having one lithium atom, wherein the hydrocarbyl may be alkyl, cycloalkyl, aryl, aralkyl or alkaryl, preferably saturated alkyl lithium compound, such as methyl lithium, ethyl lithium, propyl lithium, butyl lithium, pentyl lithium, hexyl lithium, 2-ethylhexyl lithium, hexadecyl lithium and cyclohexyl lithium, especially preferably butyl lithium, most preferably n-butyl lithium.

In the process according to the present invention, the organolithium is charged in twice, which results that two block copolymers having different structures (I) and (II) are obtained, this is an important technical feature of the process according to the present invention. The second organolithium initiator charge is charged in the second polymerization step, which results in a product containing block copolymer (II). The charging amount of organolithium is dependent on desired molecular weight of the polymer, and the charging ratio of the two organolithium initiator charges is dependent on the desired ratio of the two block copolymer having different structures(II) and (I). By conveniently controlling the charging ratio of the two organolithium initiator charges, the ratio of (I) to (I) can be controlled, thereby the properties of the resultant copolymer, such as melt index, elongation, hardness and tensile strength at break etc. can be controlled. In general, by gradually increasing the charging amount of the second organolithium initiator charge, it is possible to obtain a series of products having melt index from low to high, gradually increased elongation and gradually decreased tensile strength at break. In the thermoplastic elastomeric block copolymer according to the present invention, the molecular weight of the two block copolymers having different structures is about 10,000 to 500,000, and the molar ratio of the two block copolymers having different structures II/I is generally 0.01 to 0.30, preferably 0.05 to 0.20.

In the process according to the present invention, the polymerization reaction is carried out in an inert hydrocarbon solvent. Suitable solvents include saturated aliphatic hydrocarbon, such as pentane, hexane, heptane, octane, nonane and decane; naphthene, such as cyclohexane, methyl cyclohexane, ethyl cyclohexane and 1,4-dimethyl cyclohexane; aromatic hydrocarbon, such as benzene, toluene, ethyl benzene, xylene, diethyl benzene and propyl benzene. These solvents can be used alone or in combination. In the process according to the present invention, it is unnecessary to add any polar compound usually used in conventional processes for preparing styrene butadiene block copolymers into the inert hydrocarbon solvents, which leads to a simple procedure for recovering solvents. Of course, it is possible to add polar compounds to the process according to the present invention, which include, for example, tetrahydrofuran, ethylene glycol dimethyl ether, diethylene glycol dimethyl ether, triethylene glycol dimethyl ether, tetraethylene glycol dimethyl ether, and tetramethyl ethylenediamine etc.

In the process according to the present invention, there is no particular limitation on the temperature of the first polymerization step as long as it is sufficient to allow the anionic polymerization of vinyl aromatic monomer to occur. Usually, the anionic polymerization reaction is carried out at a temperature of 30° C. to 120° C., but preferably 60° C.–100° C. from the standpoint of reaction rate, most preferably 70° C.–90° C.

The temperature for carrying out the second polymerization step has a significant influence on the structure of the resultant thermoplastic elastomeric block copolymer and further affects the properties of the resultant products. According to the present invention, the second polymerization step is usually carried out at a temperature of 30° C.–150° C., preferably 60° C.–150° C., and most preferably 80° C. –140° C. In the second polymerization step, by increasing and controlling the polymerization temperature, the random copolymerization of vinyl aromatic monomer and conjugated diene can be controlled, and thus random copolymerized block of vinyl aromatic monomer/$C_4$–$C_6$ conjugated diene can be obtained. The higher the polymerization temperature, the more favorable for forming longer random copolymerized block; and the presence of the random copolymerized block leads to the increase in elongation and the gradual increase in melt index. By controlling the temperature of the second polymerization step, it is possible to obtain a copolymer having different length of random copolymerized blocks in its molecular chains, which results that a series of products having elongation from low to high and gradually increased melt index with the increase of the random copolymerized block can be obtained, which renders them suitable for use in various applications.

After the polymerization reaction is completed, it is terminated in a conventional manner, for example by adding a termination agent, examples being water, methanol, ethanol or isopropanol etc.

PREFERRED EMBODIMENTS FOR CARRYING OUT THE INVENTION

The invention is illustrated by the following examples which, however, are not to be taken as limiting in any respect.

In the following examples, the various properties are measured according to the following method:

Tensile strength at break: GB/T-528-92

Elongation at break: GB/T 528-92

Shore hardness: GB/T 531-92

Melt index: GB/T 3682-83

EXAMPLE 1

A 5-1 stainless steel polymerization reactor is purged by refined nitrogen gas for several times. Under an atmosphere of nitrogen, to the reactor are added 100 g of styrene, which has been dried and depleted of impurities, 2750 ml of cyclohexane, which has been dried and depleted of impurities, and 15.7 ml of n-butyl lithium, and the first reaction step is carried out at a temperature of 80–90° C. After 2.5 minutes, the first reaction is completed; then to the reactor are added 127.5 g of styrene, which has been dried and depleted of impurities, 372 g of butadiene, which has been dried and depleted of impurities, 500 ml of cyclohexane, which has been dried and depleted of impurities, and 1.5 ml of n-butyl lithium, and the second reaction step is carried out at a temperature of 100–125° C. After 4.5 minutes, the second reaction is completed; and immediately adding a termination agent to stop the reaction. The resultant polymeric product is subjected to property test, and is found to have elongation of 992%, Shore hardness of 87, melt index of 4.63 g/10 min., and tensile strength at break of 15.30 MPa.

EXAMPLE 2

A 5-1 stainless steel polymerization reactor is purged by refined nitrogen gas for several times. Under an atmosphere of nitrogen, to the reactor are added 105 g of styrene, which has been dried and depleted of impurities, 2750 ml of cyclohexane, which has been dried and depleted of impurities, and 15.7 ml of n-butyl lithium, and the first reaction step is carried out at a temperature of 80–90° C. After 3.0 minutes, the first reaction is completed; then to the reactor are added 135.0 g of styrene, which has been dried and depleted of impurities, 360 g of butadiene, which has been dried and depleted of impurities, 500 ml of cyclohexane, which has been dried and depleted of impurities, and 1.5 ml of n-butyl lithium, and the second reaction step is carried out at a temperature of 100–125° C. After 4.5 minutes, the second reaction is completed; and immediately adding a termination agent to stop the reaction. The resultant polymeric product is subjected to property test, and is found to have elongation of 1015%, Shore hardness of 88, melt index of 8.25 g/10 min., and tensile strength at break of 12.26 MPa.

EXAMPLE 3

A 5-1 stainless steel polymerization reactor is purged by refined nitrogen gas for several times. Under an atmosphere of nitrogen, to the reactor are added 110 g of styrene, which has been dried and depleted of impurities, 2750 ml of cyclohexane, which has been dried and depleted of impurities, and 15.7 ml of n-butyl lithium, and the first reaction step is carried out at a temperature of 80–90° C. After 3.0 minutes, the first reaction is completed; then to the reactor are added 140.0 g of styrene, which has been dried and depleted of impurities, 350 g of butadiene, which has been dried and depleted of impurities, 500 ml of cyclohexane, which has been dried and depleted of impurities, and 1.5 ml of n-butyl lithium, and the second reaction step is carried out at a temperature of 100–125° C. After 4.5 minutes, the second reaction is completed; and immediately adding a termination agent to stop the reaction. The resultant polymeric product is subjected to property test, and is found to have elongation of 1045%, Shore hardness of 89, melt index of 11.63 g/10 min., and tensile strength at break of 17.85 MPa.

EXAMPLE 4

A 5-1 stainless steel polymerization reactor is purged by refined nitrogen gas for several times. Under an atmosphere of nitrogen, to the reactor are added 115 g of styrene, which has been dried and depleted of impurities, 2750 ml of cyclohexane, which has been dried and depleted of impurities, and 15.7 ml of n-butyl lithium, and the first reaction step is carried out at a temperature of 80–90° C. After 3.0 minutes, the first reaction is completed, then to the reactor are added 135.0 g of styrene, which has been dried and depleted of impurities, 350 g of butadiene, which has been dried and depleted of impurities, 500 ml of cyclohexane, which has been dried and depleted of impurities, and 1.5 ml of n-butyl lithium, and the second reaction step is carried out at a temperature of 100–125° C. After 4.0 minutes, the second reaction is completed; and immediately adding a termination agent to stop the reaction. The resultant polymeric product is subjected to property test, and is found to have elongation of 1000%, Shore hardness of 88, melt index of 25.18 g/10 min., and tensile strength at break of 12.16 MPa.

EXAMPLE 5

A 5-1 stainless steel polymerization reactor is purged by refined nitrogen gas for several times. Under an atmosphere of nitrogen, to the reactor are added 127.5 g of styrene, which has been dried and depleted of impurities, 2750 ml of cyclohexane, which has been dried and depleted of impurities, and 15.7 ml of n-butyl lithium, and the first reaction step is carried out at a temperature of 80–90° C. After 3.0 minutes, the first reaction is completed; then to the reactor are added 160.0 g of styrene, which has been dried and depleted of impurities, 312.5 g of butadiene, which has been dried and depleted of impurities, 500 ml of cyclohexane, which has been dried and depleted of impurities, and 1.5 ml of n-butyl lithium, and the second reaction step is carried out at a temperature of 100–125° C. After 4.5 minutes, the second reaction is completed; and immediately adding a termination agent to stop the reaction. The resultant polymeric product is subjected to property test, and is found to have elongation of 944%, Shore hardness of 90, melt index of 19.35 g/10 min., and tensile strength at break of 12.16 MPa.

EXAMPLE 6

A 5-1 stainless steel polymerization reactor is purged by refined nitrogen gas for several times. Under an atmosphere of nitrogen, to the reactor are added 125 g of styrene, which has been dried and depleted of impurities, 2750 ml of cyclohexane, which has been dried and depleted of impurities, and 15.7 ml of n-butyl lithium, and the first reaction step is carried out at a temperature of 80–90° C. After 3.0 minutes, the first reaction is completed; then to the reactor are added 127.5 g of styrene, which has been dried and depleted of impurities, 347.5 g of butadiene, which has been dried and depleted of impurities, 500 ml of cyclohexane, which has been dried and depleted of impurities, and 1.5 ml of n-butyl lithium, and the second reaction step is carried out at a temperature of 100–125 ° C. After 4.0 minutes, the second reaction is completed; and immediately adding a termination agent to stop the reaction. The resultant polymeric product is subjected to property test, and is found to have elongation of 895%, Shore hardness of 90, melt index of 8.86 g/10 min., and tensile strength at break of 22.75 MPa.

EXAMPLE 7

The steps of example 6 are repeated except that the amount of styrene used in the first reaction step(S1) is changed into 120 g and the amount of styrene used in the second reaction step(S2) is changed into 132.5 g. The resultant product has elongation of 920%, Shore hardness of 90, melt index of 17.16 g/10 min., and tensile strength at break of 20.01 MPa.

EXAMPLE 8

The steps of example 6 are repeated except that the amount of styrene used in the first reaction step(S1) is changed into 117.5 g and the amount of styrene used in the second reaction step(S2) is changed into 135 g. The resultant product has elongation of 1000%, Shore hardness of 88, melt index of 25.18 g/10 min., and tensile strength at break of 18.92 MPa.

EXAMPLE 9

The steps of example 6 are repeated except that the amount of styrene used in the first reaction step(S1) is changed into 115 g and the amount of styrene used in the second reaction step(S2) is changed into 137.5 g. The resultant product has elongation of 1043%, Shore hardness of 90, melt index of 15.6 g/10 min., and tensile strength at break of 17.85 MPa.

EXAMPLE 10

The steps of example 6 are repeated except that the amount of styrene used in the first reaction step(S1) is changed into 110 g and the amount of styrene used in the second reaction step(S2) is changed into 142.5 g. The resultant product has elongation of 1100%, Shore hardness of 90, melt index of 13.4 g/10 min., and tensile strength at break of 16.70 MPa.

By comparing the data of examples 6–10, it can be seen that as the ratio of the amount of styrene used in the second step to that in the first step, S2/S1, increases(from 1.0 to 1.3), the elongation of the resultant products is gradually increased(from 895% to 1100%), the tensile strength at break is gradually decreased(22.75 MPa to 16.70 MPa), and the melt index reaches maximum in example 8. Therefore, it is possible to her regulate the properties of the resultant products, such as elongation, tensile strength at break and melt index by regulating the ratio S2/S1 according to the present invention.

EXAMPLE 11

A 5-1 stainless steel polymerization reactor is purged by refined nitrogen gas for several times. Under an atmosphere of nitrogen, to the reactor are added 120 g of styrene, which has been dried and depleted of impurities, 2750 ml of cyclohexane, which has been dried and depleted of impurities, and 15.7 ml of n-butyl lithium, and the first reaction step is carried out at a temperature of 80–90° C. After 3.0 minutes, the first reaction is completed; then to the reactor are added 132.5 g of styrene, which has been dried and depleted of impurities, 347.5 g of butadiene, which has been dried and depleted of impurities, 500 ml of cyclohexane, which has been dried and depleted of impurities, and 0.5 ml of n-butyl lithium, and the second reaction step is carried out at a temperature of 100–125° C. After 5.0 mninutes, the second reaction is completed; and immediately adding a termination agent to stop the reaction. The resultant polymeric product is subjected to property test, and is found to have elongation of 937%, Shore hardness of 90, melt index of 9.67 g/10 min., and tensile strength at break of 16.57 MPa.

EXAMPLE 12

The steps of example 11 are repeated except that the amount of n-butyl lithium used in the second reaction step is changed into 1.5 ml. The resultant product has elongation of 940%, Shore hardness of 90, melt index of 16.3 g/10 min., and tensile strength at break of 15.49 MPa.

EXAMPLE 13

The steps of example 11 are repeated except that the amount of n-butyl lithium used in the second reaction step is changed into 2.5 ml. The resultant product has elongation of 952%, Shore hardness of 88, melt index of 22.2 g/10 min., and tensile strength at break of 13.44 MPa.

EXAMPLE 14

The steps of example 11 are repeated except that the amount of n-butyl lithium used in the second reaction step is changed into 3.0 ml. The resultant product has elongation of 985%, Shore hardness of 88, melt index of 18.14 g/10 min., and tensile strength at break of 12.94 MPa.

EXAMPLE 15

The steps of example 11 are repeated except that the amount of n-butyl lithium used in the second reaction step is changed into 3.5 ml. The resultant product has elongation of 1000%, Shore hardness of 88, melt index of 20.7 g/10 min., and tensile strength at break of 12.16 MPa.

EXAMPLE 16

The steps of example 11 are repeated except that the amount of n-butyl lithium used in the second reaction step is changed into 4.5 ml. The resultant product has elongation of 1087%, Shore hardness of 87, melt index of 19.60 g/10 min., and tensile strength at break of 10.88 MPa.

By comparing the data of examples 11–16, it can be seen that as the amount of n-butyl lithium used in the second step increases, that is the ratio (II)/(I) in the copolymer increases (from 0.03 to 0.3), the elongation of the resultant products is gradually increased(from 937% to 1087%), the tensile strength at break is gradually decreased(16.57 MPa to 10.88 MPa), and the melt index reaches maximum in example 13. Therefore, it is possible to control the properties of the resultant products, such as elongation, tensile strength at break and melt index by simply altering the amount of the initiator charged in the second step according to the present invention.

EXAMPLE 17

A 5-1 stainless steel polymerization reactor is purged by refined nitrogen gas for several times. Under an atmosphere of nitrogen, to the reactor are added 115 g of styrene, which has been dried and depleted of impurities, 2750 ml of cyclohexane, which has been dried and depleted of impurities, and 13.3 ml of n-butyl lithium, and the first reaction step is carried out at a temperature of 78–90° C. After 3.3 minutes, the first reaction is completed; then to the reactor are added 137.5 g of styrene, which has been dried and depleted of impurities, 347.5 g of butadiene, which has been dried and depleted of impurities, 500 ml of cyclohexane, which has been dried and depleted of impurities, and 2.0 ml of n-butyl lithium, and the second reaction step is carried out at a temperature of 75–100° C. After 8.1 minutes, the second reaction is completed; and immediately adding a termination agent to stop the reaction. The resultant polymeric product is subjected to property test, and is found to have elongation of 897%, Shore hardness of 89, melt index of 9.5 g/10 min., and tensile strength at break of 14.70 MPa.

EXAMPLE 18

The steps of example 17 are repeated except that the temperature in the second reaction step is changed into 87–120° C. The resultant product has elongation of 993%, Shore hardness of 88, melt index of 18.1 g/10 min., and tensile strength at break of 12.35 MPa.

EXAMPLE 19

The steps of example 17 are repeated except that the temperature in the second reaction step is changed into 95–127° C. The resultant product has elongation of 1064%, Shore hardness of 85, and tensile strength at break of 11.90 MPa.

EXAMPLE 20

The steps of example 17 are repeated except that the temperature in the second reaction step is changed into 100–136° C. The resultant product has elongation of 1100%, Shore hardness of 79, melt index of 18.57 g/10 min., and tensile strength at break of 11.31 MPa.

By comparing the data of examples 17–20, it can be seen that increasing the polymerization temperature in the second step results in an increased elongation.

Industrial Applicability

According to the present invention, it is possible to conveniently obtain thermoplastic elastomers having elongation from low to high, tensile strength at break from high to low, and melt index and hardness capable of being regulated within a wide range, as required by the application fields, which can be used in various application fields of conventional styrene butadiene block copolymers. For example, the copolymer according to the present invention having high elongation and appropriate melt index is suitable for use as asphalt modifier and for the preparation of adhesives, especially as plastic modifier; the copolymer according to the present invention having high strength is suitable for use in shoe manufacturing and other non-tyre articles of universal rubber; and the copolymer according to the present invention having a compromise between strength and elongation can be used for making eraser rubber, thermoplastic colour articles or translucent articles.

The process according to the present invention is simpler, compared with the prior art processes. The constituents of the resultant copolymer can be controlled by conveniently altering the process conditions, especially the polymerization temperature in the second reaction step and the charging ratio of the organolithium initiators added in twice, as well as the charging ratio of the monovinyl aromatic monomers added in twice($A_2/A_1$), which alters the properties of the resultant copolymer and renders it suitable for various applications. In addition, by using higher polymerization temperature, the polymerization procedure can be simplified, the polymerization time is shortened as about 10 minutes and the utilitization of the equipment and the production efficiency are greatly improved.

What is claimed is:

1. A thermoplastic elastomeric block copolymer having the following two structures:

$A_1$-B-$A_2$/B-$A_2$(I)

B-$A_2$/B-$A_2$(II)

wherein $A_1$ represents monovinyl aromatic monomer homopolymer block formed by a first monovinyl aromatic monomer, $A_2$ represents monovinyl aromatic monomer homopolymer block formed by a second monovinyl aromatic monomer, B represents $C_4$–$C_6$ conjugated diene homopolymer block, $A_2$/B represents random copolymer block formed by the second monovinyl aromatic monomer and $C_4$–$C_6$ conjugated diene, wherein the ratio of total monovinyl aromatic monomers to $C_4$–$C_6$ conjugated diene $A_{total}/B_{total}$ is 10/90–60/40 (by weight), the ratio of the first monovinyl aromatic monomer to the second monovinyl aromatic monomer $A_1/A_2$ is 1/1.0–111.5 (by weight), and the molar ratio of the two block copolymers having different structures II/I is 0.01–0.30.

2. A copolymer according to claim 1, wherein both the first and the second monovinyl aromatic monomers are styrene and said $C_4$–$C_6$ conjugated diene is 1,3-butadiene.

3. A copolymer according to claim 1, wherein the ratio of total monovinyl aromatic monomers to $C_4$–$C_6$ conjugated diene $A_{total}/B_{total}$ is 25/75–45/55 (by weight).

4. A copolymer according to claim 1, wherein the ratio of the first monovinyl aromatic monomer to the second monovinyl aromatic monomer $A_1/A_2$ is 1/1.1–1/1.3 (by weight).

5. A copolymer according to claim 1, wherein the molar ratio of the two block copolymers having different structures II/I is 0.05–0.20.

6. A process for the preparation of the copolymer according to claim 1, comprising the steps of:

(1) polymerizing a first monovinyl aromatic monomer charge ($A_1$) under anionic polymerization conditions and in the presence of a first organolithium compound initiator charge (Li1), and allowing complete polymerization of the monomers to occur; thereafter (2) to the reaction mixture obtained in step (1), charging $C_4$–$C_6$ conjugated diene (B), a second monovinyl aromatic monomer charge ($A_2$) and a second organolithium compound initiator charge (Li2), and allowing complete polymerization of the monomers to occur at a temperature of 30° C.–150° C.

7. A process according to claim 6, wherein the total charging ratio of monovinyl aromatic monomers to $C_4$–$C_6$ conjugated diene $A_{total}/B_{total}$ is 10/90–60/40 (by weight), the charging ratio of the two monovinyl aromatic monomer charges $A_1/A_2$ is 1/1.0–1/1.5 (by weight), and the molar ratio of the second organolithium charge to the first organolithium charge is 0.01–0.30.

8. A process according to claim 6, wherein both the first and the second monovinyl aromatic monomer charges are styrene and said $C_4$–$C_6$ conjugated diene is 1,3-butadiene.

9. A process according to claim 6, wherein the polymerization temperature in said step 1) is 70–90° C.

10. A process according to clam 6, wherein the polymerization temperature in said step 2) is 60–150° C.

11. A process according to claim 10, wherein the polymerization temperature in said step 2) is 80–140° C.

* * * * *